United States Patent [19]

Watanabe et al.

[11] Patent Number: 4,825,201

[45] Date of Patent: Apr. 25, 1989

[54] DISPLAY DEVICE WITH PANELS COMPARED TO FORM CORRECTION SIGNALS

[75] Inventors: Kazuhiro Watanabe; Makoto Ota; Toshiharu Imamura, all of Sagamihara, Japan

[73] Assignee: Mitsubishi Denki Kabushiki Kaisha, Tokyo, Japan

[21] Appl. No.: 911,114

[22] Filed: Sep. 24, 1986

[30] Foreign Application Priority Data

Oct. 1, 1985 [JP] Japan ................... 60-150353

[51] Int. Cl.$^4$ ............................... G09G 3/00
[52] U.S. Cl. ................... 340/717; 340/763; 340/765; 340/793; 340/812
[58] Field of Search ............... 340/757, 765, 767, 763, 340/716, 713, 714, 715, 717, 812, 728, 793; 350/345, 331 T; 250/205; 358/168, 169, 901

[56] References Cited

U.S. PATENT DOCUMENTS

| | | | |
|---|---|---|---|
| 3,471,740 | 10/1969 | Dreyfoos et al. | 358/168 |
| 3,573,789 | 4/1971 | Sharp et al. | 340/728 |
| 3,647,958 | 9/1987 | Sobel . | |
| 3,830,970 | 8/1974 | Murley et al | 358/168 |
| 3,986,186 | 10/1976 | Cochran | 340/812 |
| 4,298,866 | 11/1981 | Modemaekers | 350/331 T |
| 4,379,292 | 4/1983 | Minato et al. | 340/812 |
| 4,415,921 | 11/1983 | Mulvanny et al. | 358/168 |
| 4,523,232 | 11/1985 | Kameda et al. | 358/169 |
| 4,578,672 | 3/1986 | Oota et al. | 340/702 |

Primary Examiner—John W. Caldwell, Sr.
Assistant Examiner—Jeffery A. Brier
Attorney, Agent, or Firm—Oblon, Fisher, Spivak, McClelland & Maier

[57] ABSTRACT

A display device having a number of display panels arranged in a plane to constitute a large picture image screen includes a correction-value determining means positioned in front of and apart from the display panels to observe the optical condition of the display panels so as to determine a part to be corrected in the display panels and a value to be corrected for the part, a correction signal generating means for generating a correction signal on the basis of the corrected value which is provided from the correction value determining means, correction circuits for the display panels, and a recorrection signal generating means which receives the correction signal from the correction signal generating means and transmits a recorrection signal to the correction circuit for one or more number of the display panels to be corrected.

5 Claims, 6 Drawing Sheets

13: Correction-value determining device

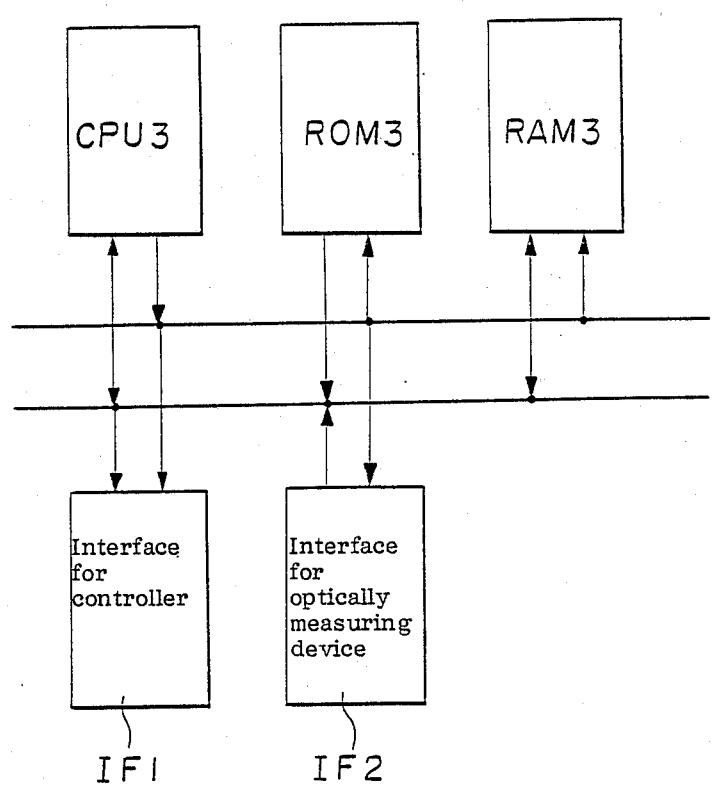

DISPLAY DEVICE WITH PANELS COMPARED TO FORM CORRECTION SIGNALS

BACKGROUND OF THE INVENTION

1. Field of the invention

The present invention relates to a display device for providing a large picture image screen by arranging regularly a large member of display panels. More particularly, it relates to such a display device in which correction can be made for each display panel.

2. Description of the prior art

FIG. 7 is a cross-sectional view showing a part of a picture image screen of a conventional display device which comprises a plurality of display units 1 regularly arranged in the vertical and horizontal directions in a plane to constitute a large picture image screen, each of the display units holding a plurality of multi-color display panels such as liquid crystal panels each of which consists picture elements: red, blue and green.

Each pair of adjustable volumes 3 provided in each of the display units 1 are connected to a control panel (not shown) placed at the reverse side of the display units so that by operating a knob of each of the adjustable volumes, a driving signal for the display panel is controlled through a driving circuit provided in the control panel, whereby the total brightness of the display panel 2 balance in the three colors, i.e. red, blue and green can be adjusted.

In the conventional display device having the construction as above-mentioned, adjusting of the picture screen has been carried out as follows.

Firstly, adjustment is carried out for each display unit 1 having a plurality of the display panels 2. The display panels 2 are operated while the total brightness and balance in colors (color tone) of each picture element of red, blue and green are adjusted in comparison with standard values. In the next place, a plurality of the display units 1 adjusted are attached to the frame (not shown) of the display device in the vertical and transverse directions in a plane to form a large picture image screen by a number of the display panels. Adjustment of a picture displayed on the large screen is carried out as follows. The display panels 2 are operated to display a picture on the large image screen and the total brightness and balance of colors: red, blue and green are observed. Since there is difference in the characteristics of each of the display panels 2, it is necessary to readjust the display panels as a whole to give the optimum condition by operating the adjustable volumes 3 provided in the control panel (not shown) at the reverse side of each of the display units 1.

In the conventional device, the adjustable volumes 3 are provided only to the display unit as an element constituting a picture screen. It is, therefore, easy that the single display unit 1 is adjusted by the adjustable volumes. However, when a number of display units 1 are arranged on the frame of the display device to form a large picture screen, there is scattering in the characteristics of the display units 1, whereby there is unevenness in brightness and color tone in the total picture image. In this case, readjustment is needed by operating the adjustable volumes 3 provided at the reverse side of each of the display units 1. In the readjustment, an operator has to stand in front of the picture screen to specify any part requiring adjustment. Then, the operator goes to the reverse side of the picture screen to operate the adjustable volumes 3, and he returns to the front of the screen to confirm whether or not the readjustment is made correctly. Thus, the readjustment operation is manually made and it is troublesome.

The display device is sometimes installed at a relatively small area. In this case, a space for working is limited, and it is difficult to manually operate the adjustable volumes 3.

SUMMARY OF THE INVENTION

It is an object of the present invention to provide a display device which allows detection of a part of a picture image which requires correction, from the side of an observer, and is provided with an adjusting means easily operable.

The foregoing and the other objects of the present invention have been attained by providing a display device comprising a number of display panels arranged in a plan to constitute a large picture image screen, which comprises a correction-value determining means positioned in front of and apart from the display panels to observe the optical condition of the display panels so as to determine a part to be corrected in the display panels and a value to be corrected for the part, a correction signal generating means for generating a correction signal on the basis of the value of correction which is provided from the correction-value determining means, correction circuits for the display panels, and a recorrection signal generating means which receives the correction signal from the correction signal generating means and transmits a recorrection signal to the correction circuits for one or more number of the display panels to be corrected.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 6 is a diagram showing the inner structure of a correction-value determining means according to the second embodiment of the present invention.

PREFERRED EMBODIMENT OF THE PRESENT INVENTION

In the following, a first embodiment of the display device according to the present invention will be described with reference to FIGS. 1 to 4.

Figure 1:
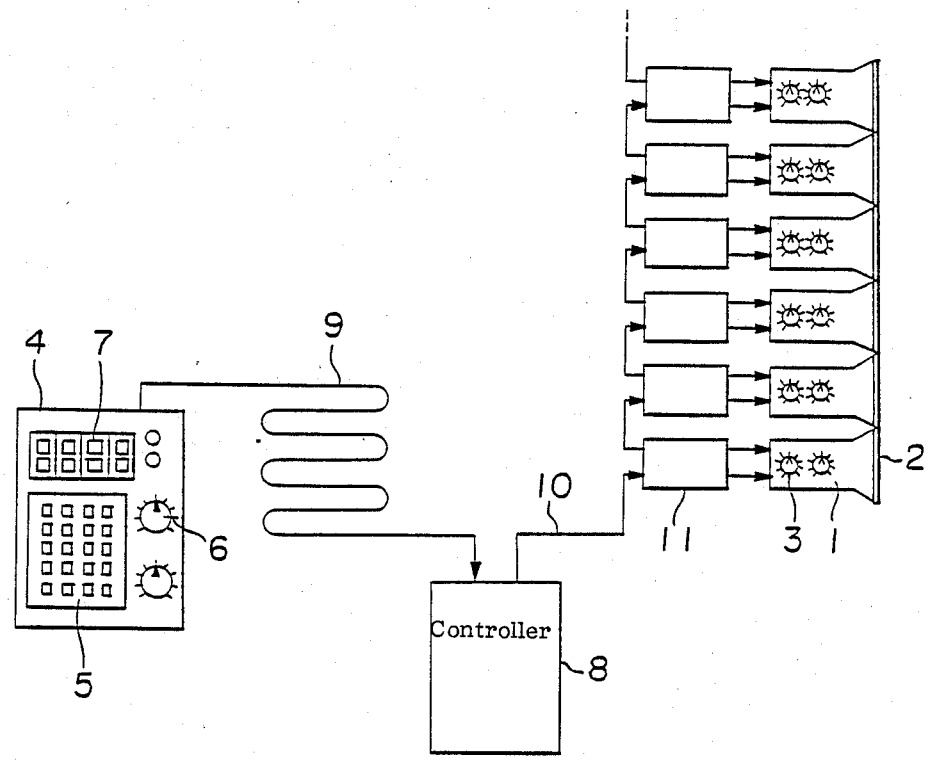
FIG. 1 is a diagram of a first embodiment of the display device according to the present invention.
Figure 7:
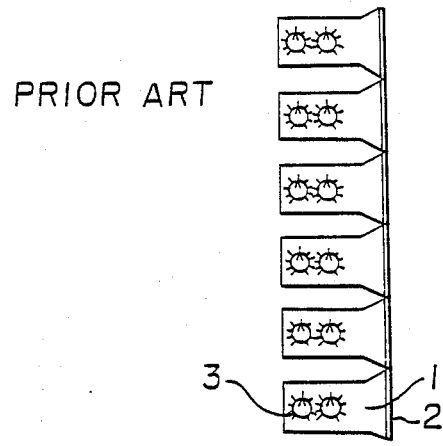
FIG. 7 is a schematic view showing a conventional display device..

FIG. 1 is a diagram showing an arrangement of elements constituting a display device provided with an adjusting means which is manually operated. In FIG. 1, the reference numerals 1, 2 and 3 designate the same part as in FIG. 7, and description of these parts is omitted.

A reference numeral 4 designates a remote box functioning as a correction signal generating means which has an indicator 5 and remote-controlled adjustable volumes 6. The indicator 5 is adapted to specify one or more display units 1 to be corrected which are detected by an optical measuring device to be manually operated or through observation by the naked eyes. The remote-controlled adjustable volumes 6 are adapted to select the optimum value of correction for the display units to be corrected. The indicator 5 may be a keyboard which specifies the position of any of the display units 1 which require the correction. The remote box 4 is further provided with a display element 7 consisting of light emission diodes and so on which show the specified display units 1 to be corrected by means of the vertical line and the transverse line.

A reference numeral 8 is a controller as a recorrection signal generating means. The controller 8 receives through a remote cable 9 correction signals indicative of the display unit 1 to be corrected specified by the remote box 4 and a correction signal for the display unit 1, and processes the correction signal corresponding to the correction value to convert a recorrection signal which is transmitted to the display unit 1 to be corrected through a cable 10.

A numeral 11 designates a correction circuit which is connected to the control panel (not shown) for each of the display units 1. The correction circuit 11 is adapted to receive the recorrection signal from the controller 8 to determine as to whether or not correction is required for the display unit 1. If the correction is required, the correction circuit transmits the recorrection signal to the control panel.

Adjustment of the displayed picture screen of the display device having the above-mentioned construction is carried out as follows.

For each of the display units 1, the brightness, the color tone and other characteristics are observed by using the optical measuring device, whereby one or more display units 1 to be corrected depending on the characteristics of the display panels 2 are determined. Then, the position of the display units 1 to be corrected is displayed on the display element 7 by operating the indicator 5 of the remote box 4. Then, the picture of the display unit 1 to be corrected is adjusted by operating the remote-controlled adjustable volumes 6 in view of the display units 1 around the display unit to be corrected, whereby the correction signal is transmitted to the controller 8 through the remote cable 9. The controller 8 supplies the recorrection signal corresponding to the correction signal provided by the remote box 4 to the correction circuit 11 to correct the display unit 1 specified by the remote box 4. The recorrection signal is transmitted to the control panel (not shown) for the display unit 1 to be corrected through the correction circuit 11 so that the brightness and the color tone of the display panel 1 are corrected. Thus, a good picture image can be obtained on the display panel 2 by repeatedly operating the volumes 6 and observing the picture image on the display panel.

The remote box 4, the controller 8 and the correction circuit 11 used for the first embodiment as shown in FIG. 1 will be described in more detail.

Figure 2:
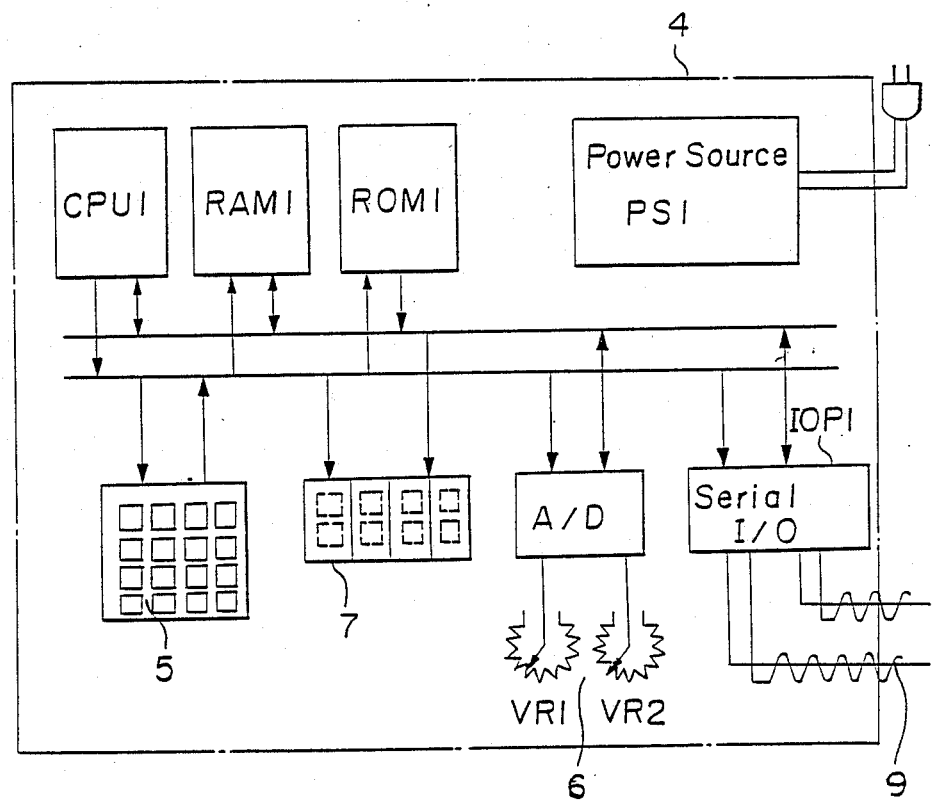
FIG. 2 is a diagram showing the inner structure of a remote box according to the first embodiment of the present invention.

As shown in FIG. 2, the remote box 4 comprises the indicator 5 as a key matrix for inputting data, the display element as an LED matrix 7 for displaying the data, the remote-controlled adjustable volumes 6 for inputting the quantity of correction for the display unit 1 to be corrected, an A/D converter AD for converting an output from the remote-controlled adjustable volumes into a digital signal, and a serial input/output port IOP1 for communicating data between the controller 8 and the remote box 4, all of which are controlled by a central processing unit CPU1 placed inside the remote box 4. A control program is stored in a first memory device ROM1. Data necessary to perform the program is stored in a second memory device RAM1. A power source PS1 is provided to supply a stable D.C. voltage to each of the elements.

The central processing unit CPU1 in the remote box 4 scans the key matrix 5 to detect the key operated. When any of the keys is operated, the code for the operated key is stored in a key buffer in the second memory device RAM. Similarly, the CPU get the quantity of operation of the volumes VR1, VR2 and the values corresponding to the quantity of operation are stored in each buffer for each of the volumes in the second memory device RAM1. Further, the CPU reads the content of an LED buffer in the second memory device RAM1 to display the data on the light emission diodes. Then, the content of the serial input/output port IOP1 is checked and operation of the serial input/output port is stopped until a signal requesting a communication is received from the controller 8. When the signal from the controller 8 comes, the content of the key buffer and the content of the VR1 and VR2 buffers stored in the second memory device RAM1 are read out, and the data subjected to serial conversion is transmitted to the controller 8 through the remote cable 9. On receiving the transmitted data, the controller 8 feeds a code for the LED through the remote cable 9, and the remote box 4 memorizes the code in the LED buffer in the second memory device RAM1. A series of operations as above-mentioned are repeatedly carried out in the remote box 4.

Figure 3:
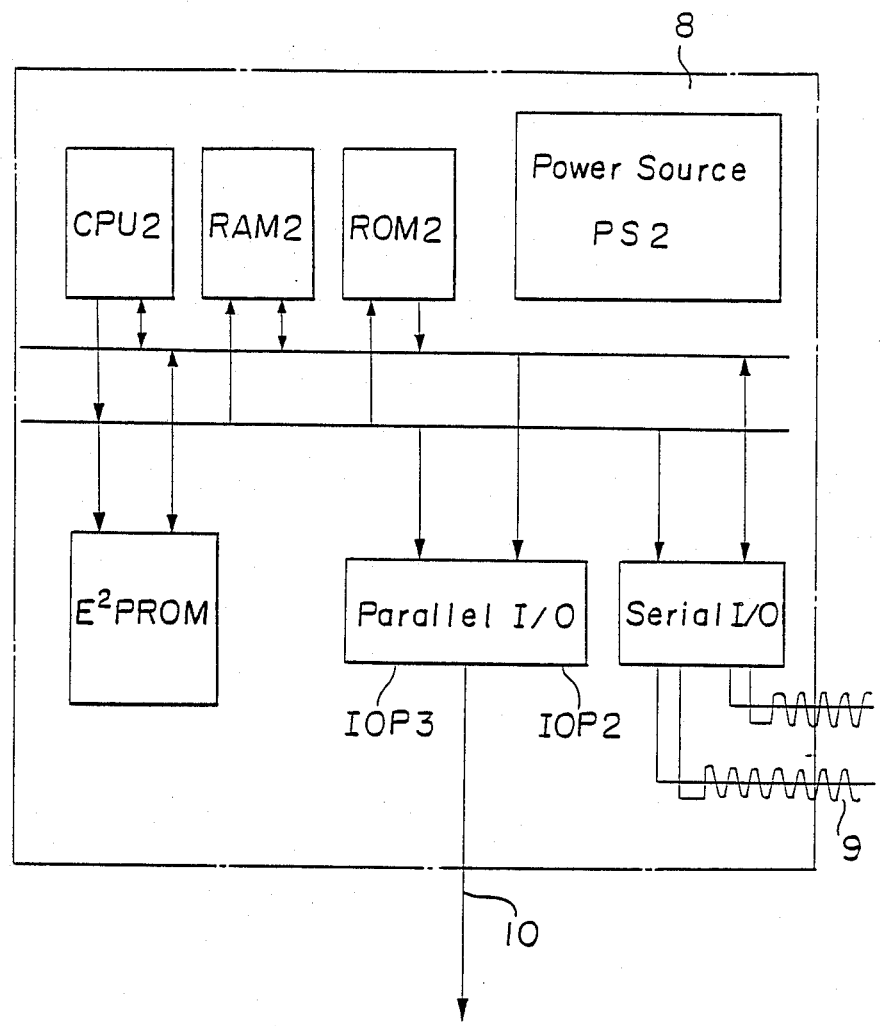
FIG. 3 is a diagram showing the inner structure of a controller according to the first embodiment.

The detail of the controller 8 will be described with reference to FIG. 3.

The controller 8 comprises a serial input/output port IOP2 for receiving data transmitted from the remote box 4, a central processing unit CPU2 for processing the data, a first memory device ROM2 holding a processing program, a second memory device RAM2 for storing data for running the program, a third memory device E$^2$PROM for storing correction data for each of the display units in spite of interruption of electric service, a parallel input/output port IOP3 for transmitting the data to the correction circuit and a power source PS2.

The central processing unit CPU2 in the controller 8 request data to the remote box 4 through the serial input/output port IOP2. On receiving the request, the remote box 4 supplies to the CPU a key code and the data of operation of the controllable volumes VR1, VR2. The central processing unit CPU2 calculates the address of the display unit according to the key code whereby the correction circuit for the display unit to be corrected is selected through the parallel input/output port IOP3. Then, the data of operation of the volumes VR1, VR2 are transmitted to the correction circuit through the parallel input/output port IOP3. And then, the values corresponding to the quantity of operation of the volumes VR1, VR2 are written in a correction data buffer for the display unit in the third memory device. Thus, correction for each of the display units is carried out by repeating the operations as above-mentioned.

The correction data for each of the display units stored in the third memory E²PROM are not lost even when the power source becomes faulty. When the power source is reconstructed, the correction data are read out from the third memory and the data are transmitted to the correction circuit for each of the display units through the parallel input/output port IOP3.

Figure 4:
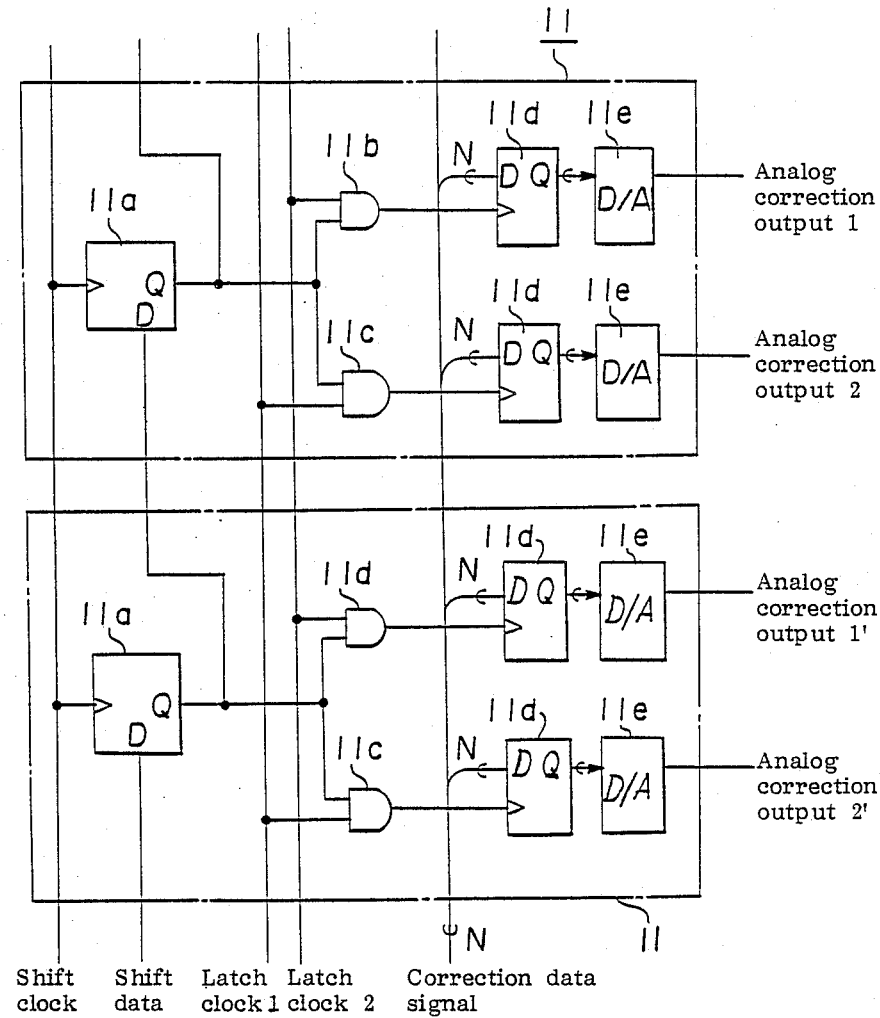
FIG. 4 is a diagram showing the inner structure of a correction circuit according to the first embodiment.

Description will be made as to the correction circuit 11 with reference to FIG. 4. FIG. 4 shows only two correction circuits 11, 11. In fact, however, there are a large number of correction circuits in the embodiment of the present invention. Transmission of the correct data to a desired correction circuit is performed by controlling a shift clock and shift data by the controller 8 so that an output Q of multi-staged shift resisters constituted by a one-bit latch 11a in the correction circuit 11 is rendered to be logic "1" for only the correction circuit to which the correction data are to be transmitted. Also, the output Q of the one-bit latch 11a is connected to two binary input AND circuits 11b, 11c. The input side of the AND circuits 11b, 11c is connected to the latch clock 1 and the latch clock 2. The outputs of the two binary input AND circuits 11b, 11c are respectively connected to the clock input of N-bit latches 11d. Data are written in the N-bit latches 11d by changing the latch clock 1 or the latch clock 2 from the logic "0" to the logic "1" under the condition that the correction data of N-bits are supplied to the N-bit latches 11d. The correction data latched by the N-bit latches 11d are converted from a digital form to an analog form by the D/A converter 11e. A voltage for correction in an analog form is electrically added to the output of the volumes in the display unit to become a complete correction signal.

Figure 5:
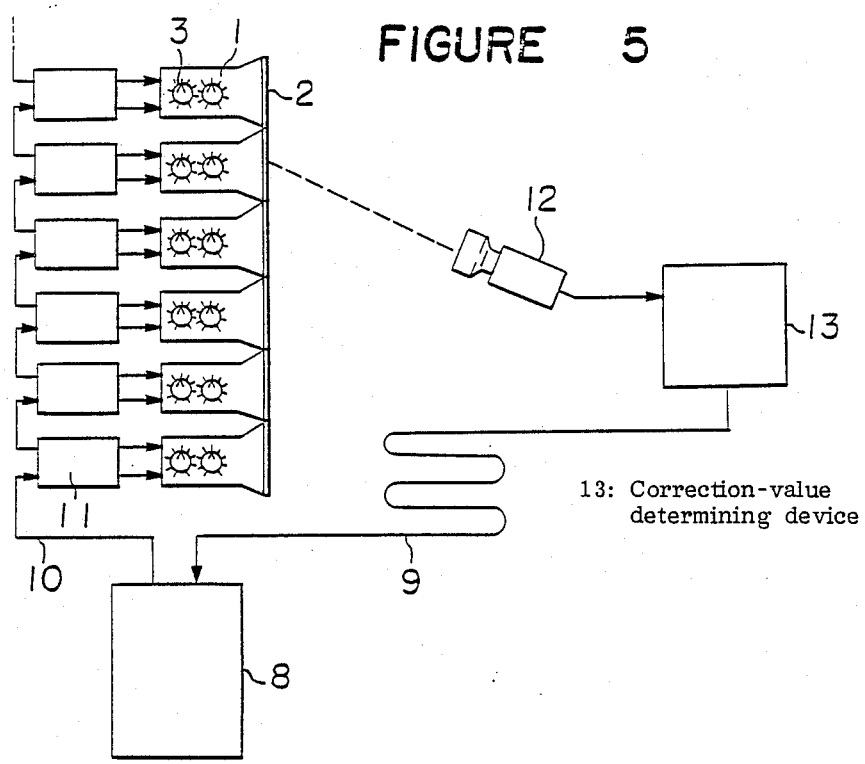
FIG. 5 is a diagram of a second embodiment of the display device according to the present invention.

FIG. 5 shows a second embodiment of the display device according to the present invention. In FIG. 5, reference numerals 1 to 3 and 8 to 11 designate the same or corresponding parts as in the first embodiment of the present invention.

A reference numeral 12 designates an optical measuring device which measures brightness, color tone and other optical properties of each of the display panels to specify the position of the display unit which requires correction and generates a signal of measuring value. A numeral 13 designates a correction-value determining device which receives the signal of measurement from the optical measuring device 12 and calculates the position of the display unit to be corrected and a correction value. The correction-value determining device also functions to generate a correction signal.

The display device according to the second embodiment operates as follows.

The optical measuring device 12 measures the brightness and the color tone of each of the display units 1 one by one. And, the result of the measurement is supplied to the correction-value determining device 13, which in turn transmits to the controller 8 the correction signals of the value to be corrected and of the position of the display unit 1 to be corrected. The controller 8 produces and transmits a recorrection signal corresponding to the correction signal provided from the correction-value determining device 13 to the correction circuit 11 for the display unit 1 to be corrected. The recorrection signal is transmitted from the correction circuit 11 to the control panel (not shown), whereby the brightness and the color tone of the display panel 2 are corrected. Thereafter, the brightness, the color tone and other optical properties of each of the display units 1 are again measured by the optical measuring device 12. Then, similar to the description as above-mentioned the display unit 1 is subjected to correction; thus, the total picture image is corrected.

The correction-value determining device 13 has a construction as shown in FIG. 6. Namely, it is provided with an interface IF1 for the controller 8 which receives data from and transmits data to the controller 8, a second interface IF2 for the optical measuring device 12 which receives data from and transmits data to the optical measuring device 12, a central processing unit CPU3 for processing the data, a first memory device ROM3 holding the processing program and a second memory device RAM3 for storing data for the running of the program.

The correction-value determining device 13 functions to read measurement values concerning the brightness of each of the display units which are provided by the optical measuring device 12, and to calculate the correction value for each of the display units on the basis of the measurement values.

The function of the second embodiment can be attained by using a personal computer with interfaces in association with the controller, the interface and the optical measuring device.

As described above, the display device of the present invention is provided with the correction-value determining means which observes an optical condition of each of the display panels constituting a picture image screen and determines the position of the display panel to be corrected and the correction value for the corrected display panel, the correction signal generating means for producing a correction signal on the basis of the value of the correction signal generated from the correction-value determining means, and the recorrection signal generating means which receives the correction signal and transmits the recorrection signal to the correction circuit for the display panel which requires correction. Accordingly, it is possible to easily adjust the picture image screen by finding the position of the display panel which requires correction. Further, the display device according to the present invention allows correction of the picture image screen even through the display device is installed at a position difficult to manually adjust the device.

What is claimed is:

1. A display device comprising a number of display panels arranged in a plane to constitute a large picture image screen, which comprises a correction signal generating means, including means for determining at least one of said display panels to be corrected, for generating a correction signal in response to a comparison of the optical condition of the panel to be corrected in said display panels with the optical condition of at least some other display panels so that the optical condition of the corrected display panel is the same as the other ones, correction circuits for said display panels, and a recorrection signal generating means which receives said correction signal from said correction signal generating means and transmits a recorrection signal to the correction circuit for one or more number of said display panels to be corrected.

2. The display device according to claim 1, wherein said correction signal generating means is provided with an indicator for specifying one or more number of said display panels requiring correction among said number of display panels arranged in a matrix form, and an adjusting member for determining a value for correction.

3. The display device according to claim 2, wherein said indicator is constituted by a keyboard having a plurality of keys arranged in the matrix form having vertical and transverse lines and a display element capable of indicating a display panel by operating said keyboard.

4. The display device according to claim 1, wherein said correction signal generating means determines a part to be corrected in said display panels and a corrected value for the part in association with an optical measuring device.

5. The display device according to claim 1, wherein a liquid crystal panel is used for said display panel.

* * * * *